Patented May 5, 1942

2,281,937

UNITED STATES PATENT OFFICE 2,281,937

THERAPEUTIC COMPOSITION

Samuel C. Johnson, Uniontown, Pa., assignor to M. Neal Gordon, New York, N. Y.

No Drawing. Application February 21, 1939, Serial No. 257,661

4 Claims. (Cl. 167—53)

This invention relates to medicinal preparations particularly effective in the treatment of burns, eczema, impetigo and diseases of the skin.

I have discovered that the ortho, para and meta nitro phenols, when applied to the skin, not only have strong therapeutic properties such as renders them valuable as antiseptic and germicidal agents but also are characterized by the fact that they are non-toxic, non-irritant and non-destructive of tissue. In addition, I have found that the ortho and to less extent the meta nitro phenols have the ability to rapidly penetrate the skin and be absorbed by the blood of the human body. This capacity of the ortho and meta nitro phenols to rapidly penetrate the skin results in increased germicidal activity thereof at the same time that it insures the prompt and complete elimination of these substances from the body by way of the kidneys. Also, the use of the ortho or meta nitro phenol in combination with para nitro phenol imparts to the combination penetrating properties which the para nitro phenol does not possess of itself, as the result of which the para nitro phenol, which has strong antiseptic and germicidal properties, is carried directly into the body tissues where it serves most effectively to supplement the analgesic action of the ortho or meta nitro phenol.

Tests conducted over an extensive period have conclusively demonstrated that compounds prepared in accordance with the present invention and which primarily include as the therapeutic agent either ortho, para or meta nitro phenol or a combination thereof are highly effective when locally applied in the treatment of skin burns and cuts as well as in the treatment of eczema, impetigo and other skin irritations, in all of which cases the active ingredient acts to reduce infection, relieve pain and soreness, retard blistering and restore the skin to healthy condition with the formation of a minimum of scar tissue even in the case of severe burns and it is accordingly among the objects of the present invention to provide a medicinal preparation containing one or more of the isomeric mono nitro phenols (i. e. ortho, para and/or meta nitro phenol) as the active ingredient for the treatment of skin irritations and wounds as aforesaid, which preparation may be in the form of a semi-solid ointment, such as a salve, or in the form of a liquid ointment, or in the form of a tincture for application locally to the affected area to be treated.

Where the medicinal preparation of the present invention is in the form of a salve, the bulk of the preparation may consist of any suitable ointment base such as petrolatum, petroleum jelly or any other suitable unguent, such as a cold or vanishing cream, to provide a resultant composition which is of semi-solid consistency. Where, on the other hand, the preparation is desired to be in the form of a liquid ointment the base thereof may consist principally of a bland medicinal oil, such as white mineral oil or olive oil. Where the preparation is to be in the form of a tincture, the base thereof may consist of alcohol or a solution thereof. In any case, only a relatively small quantity of the active ingredient, i. e., ortho, para and/or meta nitro phenol, is required to be mixed with the ointment base, the preferable proportion being one part of the active ingredient to thirty-three parts of the ointment base. It is to be understood, of course, that this proportion may be varied within reasonably wide limits because a preparation containing as much as fifty percent by weight of the active ingredient may be employed without any harmful results, while a preparation containing as little as one-tenth of one percent of the active ingredient may still produce very beneficial results.

The isomeric mono nitro phenols are well known substances, although the para and ortho nitro phenols are more readily available commercially than is the meta nitro phenol. While the preparation or production of these substances forms no part of the present invention, which relates to the employment thereof in the preparation of a new medicinal compound, it is thought advisable to describe herein preferred methods which may be employed in obtaining the isomeric mono nitro phenols for use in accordance with the present invention.

Thus, in the production of the ortho and para nitro phenols, eighty grams of sodium nitrate is initially dissolved in two hundred grams of heated water. Upon cooling of this initial sodium nitrate solution, one hundred grams of concentrated sulphuric acid is added thereto and the solution is stirred until it is cooled to a temperature of approximately 25 degrees C. Thereafter, and while this solution of sodium nitrate and sulphuric acid is maintained at a temperature of between 25 degrees C. and 30 degrees C., there is added to the solution drop by drop a mixture of phenol melted in alcohol, this latter mixture being in the proportion of fifty grams of crystallized phenol melted in five grams of alcohol in the presence of heat.

The resultant mixture (of the phenol in the sodium nitrate-sulphuric acid solution) is then allowed to stand for about two hours with frequent stirring during this interval, following which there is added to the mixture a volume of water twice that of the mixture. The reaction product which then collects at the bottom of the vessel in the form of a dark oil is a mixture of para nitro phenol and ortho nitro phenol, these being separated from each other by conventional distillation in steam of the ortho nitro phenol. The ortho nitro phenol distillate is cooled and filtered, following which the ortho nitro phenol residue is washed with water, pressed out on a porous plate and dried in a desiccator.

The non-volatile para nitro phenol, which remained in the vessel from which the ortho nitro phenol was removed by distillation as aforesaid, is then recovered as follows. After cooling the para nitro phenol mixture remaining in the vessel, the undissolved substances of the mixture are filtered and the filtrate thus obtained is boiled for 15 minutes with 20 grams of animal charcoal, the water as it evaporates during this boiling process being replaced with fresh water. The charcoal is then filtered off and the filtrate allowed to stand over night whereupon the para nitro phenol separates out of the solution in the form of long colorless needles.

The production of the isomer meta nitro phenol is effected by reducing meta di-nitrobenzene to meta nitro analine and then treating the solution of the latter in an excess of dilute sulphuric acid and thereafter with nitrous acid, preferably by bubbling the latter in gaseous form through the sulphuric acid solution of the meta nitro analine. The solution of the diazonium salt thus obtained is then slowly heated to boiling resulting in the production of meta nitro phenol which is purified by recrystallization from water.

It will be understood, of course, that the isomeric mono nitro phenols may be produced by methods other than those herein described, the present invention being concerned with the utilization of these phenols in the compounding of medicinal preparations having high therapeutic properties and wherein the para nitro phenol coacts with and supplements the ortho nitro phenol when combined therewith to provide results not obtainable when either the para nitro phenol or the ortho nitro phenol is employed alone. Thus, I have found that while the para nitro phenol has marked antiseptic and germicidal properties, it does not have any penetrating characteristics per se. On the other hand, I have found that the ortho nitro phenol not only has decidedly analgesic properties but also is possessed of a high tissue-penetrating power. I have further found that when the para and ortho nitro phenols are combined, the latter serves as a carrier or vehicle for the former and thus effects a penetration of the para nitro phenol through the skin and into the body tissue. This is believed to be due to the fact that the affinity between the ortho and para nitro phenols is so much greater than that existing between para nitro phenol and the body tissues, in consequence of which the para nitro phenol is readily conveyed into the body tissue together with the ortho nitro phenol.

Accordingly, where the medicinal preparation is desired to have antiseptic, analgesic and tissue-penetrating properties, the para and ortho nitro phenols are mixed together and employed in combination as the active therapeutic agent of the medicinal preparation. When so combined, it is preferable to employ approximately 80 percent of the ortho nitro phenol to 20% of the para nitro phenol, although the ratio of ortho to para nitro phenol may be as low as one to one with good results. However, it is not deemed desirable to employ less ortho nitro phenol than para nitro phenol, because in such case there is a tendency for the latter to crystallize out of solution. When the ortho nitro phenol and para nitro phenol are combined to constitute jointly the active ingredient of the medicinal preparation, it is essential that their proportions be such that the ortho nitro phenol is sufficient to effect the desired penetration of the combined active ingredient into the body tissues and at the same time facilitate complete dissolution of the para nitro phenol in the supporting vehicle or solvent (e. g. petrolatum, mineral oil, alcohol) for the active ingredient.

As one example of a medicinal preparation compounded in accordance with the present invention, the following formula may be given, the proportions stated being by weight:

| | Parts |
|---|---|
| Olive oil | 33 |
| Para nitro phenol | 0.2 } total |
| Ortho nitro phenol | 0.8 } 1 part |

This provides a non-toxic liquid ointment having marked antiseptic, analgesic and tissue-penetrating properties which is beneficial in the treatment of burns and skin diseases and irritations. It will be understood that it is within the purview of this invention to employ as the active ingredient of the medicinal compound any one of the isomer mono nitro phenols. However, in such case when the para nitro phenol is utilized alone, the preparation is lacking in tissue penetrating powers and is to be considered effective only as an antiseptic and germicide. On the other hand, when the ortho nitro phenol is utilized alone, the preparation containing it as the active ingredient is possessed of marked tissue-penetrating properties and serves effectively as an analgesic only.

As regards the meta nitro phenol, due to the fact that it is difficult and expensive to produce and, therefore, is not readily available commercially, its use as the active ingredient in medicinal preparations compounded in accordance with the present invention is necessarily restricted. However, in the absence of cost considerations, the meta nitro phenol may well be employed as the active medicament either alone or in combination with the para nitro phenol. While meta nitro phenol is not as soluble as ortho nitro phenol and, therefore, involves some greater difficulty in incorporating it in the ointment or tincture base, it in itself possesses the combined antiseptic, analgesic and tissue-penetrating properties of the para and ortho nitro phenols, although to lesser extent, and accordingly where the meta nitro phenol is employed alone the preparation containing it is quite effective as a tissue-penetrating antiseptic and analgesic.

It is to be understood that the proportions of the ingredients of the preparation of the present invention, as well as the nature thereof, may be varied within rather wide limits as indicated hereinbefore without departing from the general principles or real spirit of the invention, and that while the isomer mono nitro phenols hereinbefore referred to constitute the principal active ingredients of the preparation, other ingredients not affecting the stability or efficacy of the preparation may be used in addition thereto.

What is claimed as new and useful is:

1. A therapeutic composition comprising the ortho and para isomers of mono nitro phenol dissolved in combination in a vehicle capable of being applied locally to affected parts of the skin, said vehicle constituting approximately 33 parts and the combined ortho and para nitro phenols constituting approximately 1 part of the composition, and the ortho nitro phenol and the para nitro phenol being present in the composition in the ratio of approximately 4 parts of the former to 1 part of the latter.

2. A therapeutic composition comprising the ortho and para isomers of mono nitro phenol dissolved in combination in a vehicle capable of being applied locally to affected parts of the skin, the combined ortho and para nitro phenols constituting the smaller part of the composition by weight and being present in said composition in the ratio of approximately 4 parts of the ortho nitro phenol to 1 part of the para nitro phenol.

3. A therapeutic composition according to claim 2 wherein said vehicle is in the form of an oleaginous base.

4. A therapeutic composition according to claim 2 wherein said vehicle is in the form of a tincture-forming solvent.

SAMUEL C. JOHNSON.